Jan. 19, 1965

L. V. WAGNER 3,166,089

IRRIGATION SYSTEM

Filed Nov. 16, 1962

LEONARD V. WAGNER
INVENTOR.

BY

Jan. 19, 1965    L. V. WAGNER    3,166,089
IRRIGATION SYSTEM
Filed Nov. 16, 1962    2 Sheets-Sheet 2
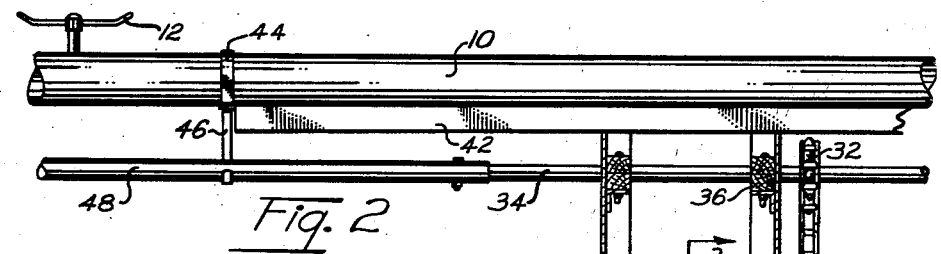
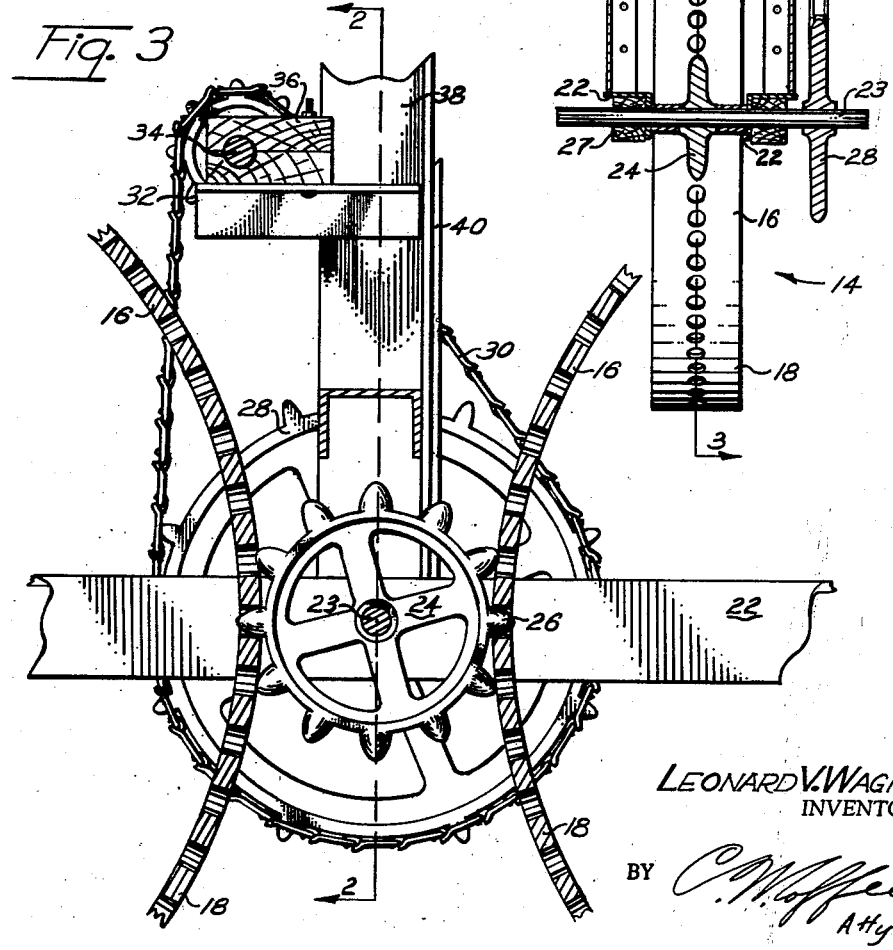
LEONARD V. WAGNER
INVENTOR.
BY
Atty.

United States Patent Office 3,166,089
Patented Jan. 19, 1965

3,166,089
IRRIGATION SYSTEM
Leonard V. Wagner, P.O. Box 427, Brownfield, Tex.
Filed Nov. 16, 1962, Ser. No. 238,246
2 Claims. (Cl. 137—344)

This invention relates to agricultural irrigation and more particularly to a system for moving sprinkler pipes from one location of the field to another.

This application claims certain subject matter which is disclosed in my co-pending U.S. patent application Serial No. 174,343, filed February 7, 1962, which itself was a continuation-in-part of my previous U.S. patent application Serial No. 131,354, filed August 14, 1961, both now abandoned.

Much of the argicultural field and crop lands are irrigated by conveying water in pipes to the location and sprinkling from the pipes upon the land. The water is conveyed through the pipes under pressure to sprinklers where it is discharged over a large area. After one area has been watered the pipes are moved to a new area to be watered. The pipes are moved to the new area manually or by some sort of vehicle. One type vehicle to move pipes is that shown in the U.S. Patent No. 2,931,579 to Ruddell, issued April 5, 1960. There a two wheeled vehicle is disclosed with a shaft along the pipe to move wheels. The irrigation pipe is mounted on a frame above the two wheels.

I have invented an improvement over such a system. According to my improvement the wheels are driven by a pinion working between the wheels. The wheels are not in the form of a conventional spur gear but have holes in the perimeter of the rim by which the teeth of the pinion operate to rotate the wheels.

An object of this invention is to provide a pipe moving system where the pipe is easily moved from one location to another.

Another object is to provide an easy adjustment as to height so that the pipe and the shaft may be raised above tall crops.

Another object is to provide a pipe moving system wherein the water-carrying pipe is not used as a transmitter of power from one vehicle to the next, such as would exert additional strain upon the water-carrying pipe.

Another object is to provide a simplified drive system for rotating the wheels of the vehicles.

A further object is to provide a system where each vehicle is driven from radial holes in the wheels.

Still further objects are to achieve the above with a device that is sturdy, compact, durable, simple, versatile, and reliable, yet inexpensive and easy to manufacture.

The specific nature of the invention as well as other objects, uses and advantages thereof will clearly appear from the following description and from the accompanying drawing, the different views of which are not necessarily to the same scale, in which:

FIG. 2 is a sectional view of the vehicle taken on line 2—2 of FIG. 3.

FIG. 3 is a sectional view of the vehicle taken substantially on line 3—3 of FIG. 2.

Figure 1:
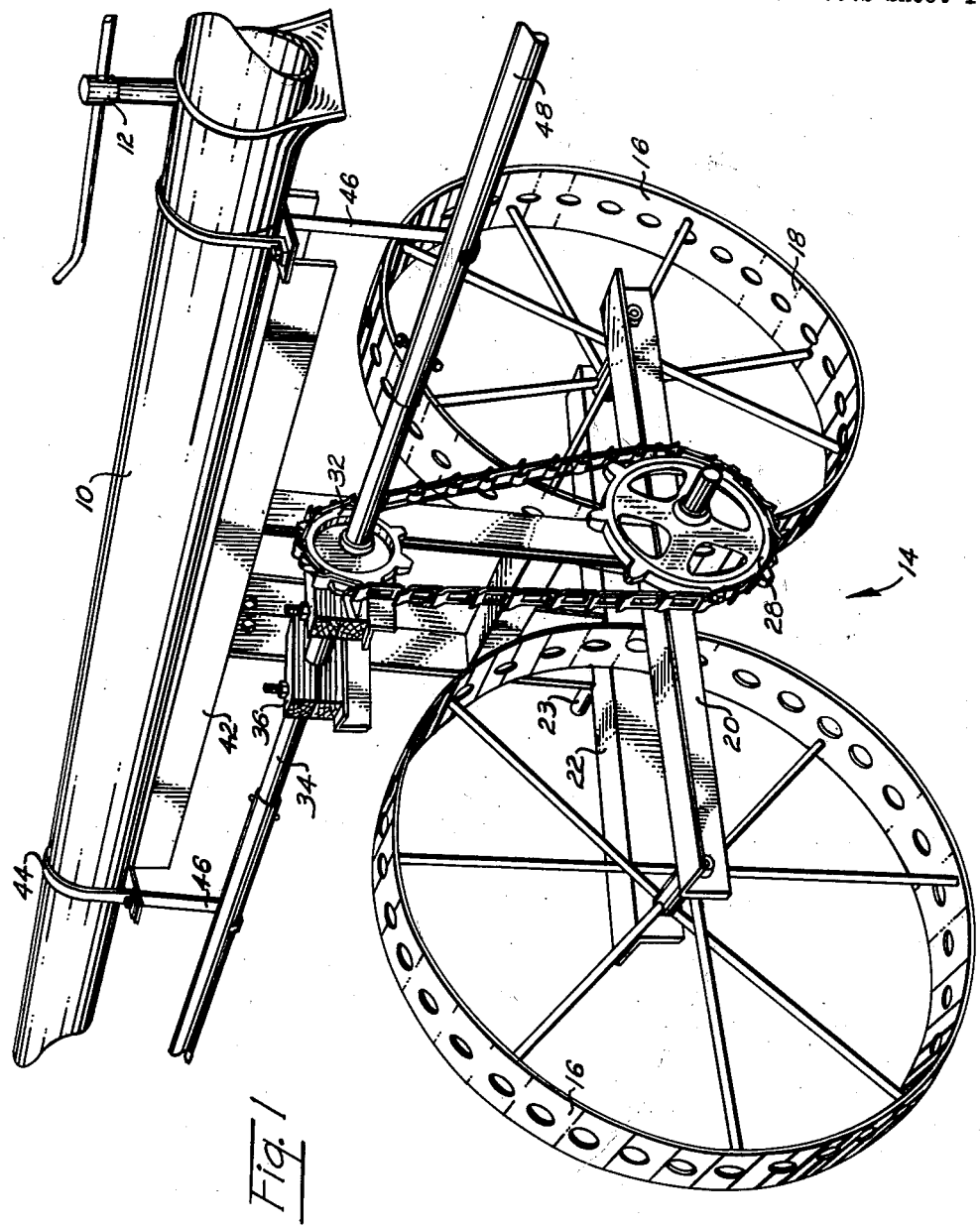
FIG. 1 is a perspective view showing a vehicle according to this invention.

As may be seen from the accompanying drawings the main object of this invention is to convey pipe 10 from one location to the other. The pipe 10 has a plurality of sprinklers 12 which discharge the water from the pipe 10 upon the field to be watered. The pipe 10 is moved by vehicles 14.

Each vehicle has two equal sized wheels 16; each wheel has a rim 18 with a plurality of radial holes in the rim. Otherwise stated, each wheel 16 has a plurality of radial holes through the circumference thereof.

The wheels 16 are mounted for rotation upon a frame 20. The frame includes two longitudinally spaced angle irons 22. The wheels are mounted for rotation about axles which extend through holes in the angle irons 22. Pinion shaft 23 is mounted for rotation half-way between the wheels 16 on the frame 20. I have found that wood bearings are desirable to use in this situation and therefore the pinion shaft 23 is mounted for rotation on wood bearings 27 which are mounted on the angle irons 22.

Pinion 24 is mounted on the shaft between the angle irons 22. The pinion 24 has a plurality of teeth or projections 26 therefrom which mate with the holes in the rim 18 of the wheel 16. Thus rotation of the pinion shaft 23 and pinion 24 results in the rotation of the wheels. The pinion shaft 23 is rotated by large sprocket 28 mounted on one end thereof. The chain 30 rotates the large sprocket 28 responsive to rotation of the small sprocket 32. The small sprocket 32 is mounted on elongated sprocket shaft 34 which is mounted for rotation in wood bearings 36. The wood bearings are mounted upon a subframe or H-frame 38. The H-frame 38 is bolted to two upright staunchions 40 which are themselves attached one each to one of the angle irons 22. A plurality of holes are provided in the staunchions 40 so that the H-frame may be elevated at any desired height above the ground. On the H-frame above the wood bearings 36 there is a beam 42 to which the pipe 10 is clamped by bands 44. From each band 44 a J-strap 46 depends. Light tubing 48 extends parallel to the pipe 10 and is maintained in place by the J-straps 46. The shaft 34 is rotated by the tubing 48 through diametrical bolts which extend through holes of the tubing and the shaft.

If it is desired that the pipe 10 and the tubing 48 be raised to have the power off the ground, this may be done as seen in FIG. 2. In this regard it will be noted that in FIG. 2 the H-frame 38 is higher than it is in FIGS. 1 and 3. Of course, when the H-frame 38 is raised by use of the plurality of holes in staunchions 40 and H-frame 38 it is necessary to change the number of links in chain 30 so that it still operates properly. As may be seen, I have provided an extremely simple arrangement for moving the pipes from one part to the other. All that is necessary is to rotate the tubing 48 by some convenient conventional means such as by motor (not seen) and the pipe is readily moved transverse to its axis from one location to another.

It will be apparent that the embodiment shown is only exemplary and that various modification can be made in construction, materials, and arrangement within the scope of the invention as defined in the appended claims.

I claim as my invention:
1. An irrigation system including
   an elongated pipe adapted to carry water under pressure,
   a plurality of spatially disposed vehicles and each attached to the pipe,
   an elongated shaft parallel to the pipe and having substantially the same length thereof;
   each vehicle having the improvement comprising:
   at least one wheel and having a substantially cylindrically shaped rim,
   said rim having a plurality of circumferentially equally spaced radial holes therethrough,
   a pinion having teeth and mounted parallel to the wheel,
   the teeth of the pinion meshing with said radial holes in the rim,
   a frame interconnecting the wheel and pinion, means on said frame for journaling said shaft thereto, and means interconnecting the pinion and shaft for rotating the pinion responsive to rotation of said shaft.

2. The invention as defined in claim 1 wherein said frame includes at least one staunchion, a sub-frame mounted for vertical adjustment on said staunchion, said pipe attached to said sub-frame, and said shaft mounted on said sub-frame.

References Cited by the Examiner

UNITED STATES PATENTS

| 656,491 | 8/00 | Valentine | 180—74 X |
|---|---|---|---|
| 1,198,098 | 9/16 | Bergh. | |
| 2,931,579 | 4/60 | Ruddell | 239—212 X |
| 2,940,672 | 6/60 | Gaskell | 239—212 |
| 2,946,515 | 7/60 | Jensen | 239—212 |

M. CARY NELSON, *Primary Examiner.*

UNITED STATES PATENT OFFICE
CERTIFICATE OF CORRECTION

Patent No. 3,166,089                                  January 19, 1965

Leonard V. Wagner

It is hereby certified that error appears in the above numbered patent requiring correction and that the said Letters Patent should read as corrected below.

In the grant, lines 1 to 3, for "Leonard V. Wagner, of Brownfield, Texas," read -- Leonard V. Wagner, of Brownfield, Texas, assignor to Wagner Sprinkler Pipe Mover, Inc., of Brownfield, Texas, a corporation of Texas, --; line 12, for "Leonard V. Wagner, his heirs" read -- Wagner Sprinkler Pipe Mover, Inc., its successors --; in the heading to the printed specification, line 3, for "Leonard V. Wagner, P. O. Box 427, Brownfield, Tex." read -- Leonard V. Wagner, Brownfield, Tex., assignor to Wagner Sprinkler Pipe Mover, Inc., Brownfield, Tex., a corporation of Texas --.

Signed and sealed this 1st day of June 1965.

(SEAL)
Attest:

ERNEST W. SWIDER                                EDWARD J. BRENNER
Attesting Officer                              Commissioner of Patents